(12) United States Patent
Kozloski et al.

(10) Patent No.: US 10,902,735 B2
(45) Date of Patent: Jan. 26, 2021

(54) EDUCATION REWARD SYSTEM AND METHOD

(71) Applicant: INTERNATIONAL BUSINESS MACHINES CORPORATION, Armonk, NY (US)

(72) Inventors: James R. Kozloski, New Fairfield, CT (US); Shikhar Kwatra, Morrisville City, NC (US); Rosanna S. Mannan, San Jose, CA (US); Emily A. Ray, Hastings on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 521 days.

(21) Appl. No.: 15/808,256

(22) Filed: Nov. 9, 2017

(65) Prior Publication Data
US 2018/0315327 A1  Nov. 1, 2018

Related U.S. Application Data

(63) Continuation of application No. 15/497,709, filed on Apr. 29, 2017, now Pat. No. 10,559,215.

(51) Int. Cl.
G09B 5/02 (2006.01)
G09B 19/00 (2006.01)
(Continued)

(52) U.S. Cl.
CPC .............. G09B 5/02 (2013.01); G06N 3/006 (2013.01); G06N 20/00 (2019.01); G09B 5/00 (2013.01); G09B 7/00 (2013.01); G09B 19/00 (2013.01)

(58) Field of Classification Search
CPC ....................................................... G09B 5/02
(Continued)

(56) References Cited

U.S. PATENT DOCUMENTS 6,585,518 B1  7/2003  Jenkins et al.
9,141,827 B2  9/2015  Ho et al.
(Continued)

FOREIGN PATENT DOCUMENTS

WO  00/46778 A1  8/2000
WO  2004/008280 A2  1/2004

OTHER PUBLICATIONS

Luckin, R. et al., "Intelligence Unleashed: An argument for AI in Education" accessed on Feb. 15, 2017, pp. 1-4, https://www.pearson.com/innovation/smarter-digital-tools/intelligence-unleashed.html.
(Continued)

Primary Examiner — Kesha Frisby
(74) Attorney, Agent, or Firm — Tutunjian & Bitetto, P.C.; Douglas Pearson

(57) ABSTRACT

A reward learning system includes a user interface configured to receive modes of user information related to a state of the user. A cognitive computing system includes a reward system. The reward system includes a dynamically upgraded profile model of the user which is updated in accordance with the user information related to the state. The reward system is updated by machine learning employing feedback from user responses measured by the user interface and searched information by the cognitive computing system. The reward system includes an increasing reward protocol based on learned user preferences and responses and rewarded in accordance with user achievements.

9 Claims, 5 Drawing Sheets

(51) Int. Cl.
  *G06N 20/00* (2019.01)
  *G09B 7/00* (2006.01)
  *G09B 5/00* (2006.01)
  *G06N 3/00* (2006.01)

(58) Field of Classification Search
  USPC .......................................................... 434/238
  See application file for complete search history.

(56) References Cited

U.S. PATENT DOCUMENTS

| | | |
|---|---|---|
| 2013/0226816 A1 | 8/2013 | Chory et al. |
| 2014/0272847 A1 | 9/2014 | Grimes et al. |
| 2015/0100530 A1 | 4/2015 | Mnih et al. |

OTHER PUBLICATIONS

List of IBM Patents or Patent Applications Treated as Related dated Nov. 9, 2017, 2 pages.

EDUCATION REWARD SYSTEM AND METHOD

BACKGROUND

Technical Field

The present invention generally relates to educational systems, and more particularly to an educational reward system that employs cognitive understanding to dynamically improve learning.

Description of the Related Art

Human computer interaction has resulted in expansive learning opportunities from the standpoint of informational availability as well as learning tools and techniques. In some examples, many people are now participating in education through computerized methods, where their learning is completely web-based. For children and adults, one reason for poor performance in school is lack of motivation. In an effort to address this problem, numerous alternatives to traditional methods of learning have emerged. One such alternative is known as rewards-based education. Reward systems reward a student's accomplishments, and this reinforcement permits the student to enjoy the learning experience and motivates the student to perform better.

SUMMARY

In accordance with an embodiment of the present invention, a reward learning system includes a user interface configured to receive modes of user information related to a state of the user. A cognitive computing system includes a reward system. The reward system includes a dynamically upgraded profile model of the user which is updated in accordance with the user information related to the state. The reward system is updated by machine learning employing feedback from user responses measured by the user interface and searched information by the cognitive computing system. The reward system includes an increasing reward protocol based on learned user preferences and responses and rewarded in accordance with user achievements.

Another reward learning system includes a user interface configured to receive a plurality of modes of user information related to a state of the user. A cognitive computing system includes a processor and memory coupled to the processor, and the memory includes a reward system stored therein. The reward system includes a dynamically upgraded profile model of the user which is updated in accordance with the user information related to the state and a state feature vector including multiple dimensions associating different features with states of the user, wherein the states of the user and changes to the states of the user are employed to evaluate rewards in a reward protocol. The reward protocol includes a reward feature vector which stores all possible reward scenarios specific to the user. A machine learning module is incorporated within the cognitive computing system, with the machine learning module associating rewards with states in accordance with positive stimulation of the user.

A method for reward-based learning includes interfacing with a user to receive a plurality of modes of user information related to a state of the user; evaluating the user information with machine learning of a cognitive computing system to determine an increasing reward protocol to award learning achievements by the user; updating the increasing reward protocol using feedback from the user from the plurality of modes of user information related to the state of the user and the machine learning; and unpredictably rewarding the user in accordance with the increasing reward protocol when goals are achieved.

A non-transitory computer readable storage medium includes a computer readable program for reward-based learning, wherein the computer readable program when executed on a computer causes the computer to interface with a user to receive a plurality of modes of user information related to a state of the user; evaluate the user information with machine learning of a cognitive computing system to determine an increasing reward protocol to award learning achievements by the user; update the increasing reward protocol using feedback from the user from the plurality of modes of user information related to the state of the user and the machine learning; and unpredictably reward the user in accordance with the increasing reward protocol when goals are achieved.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
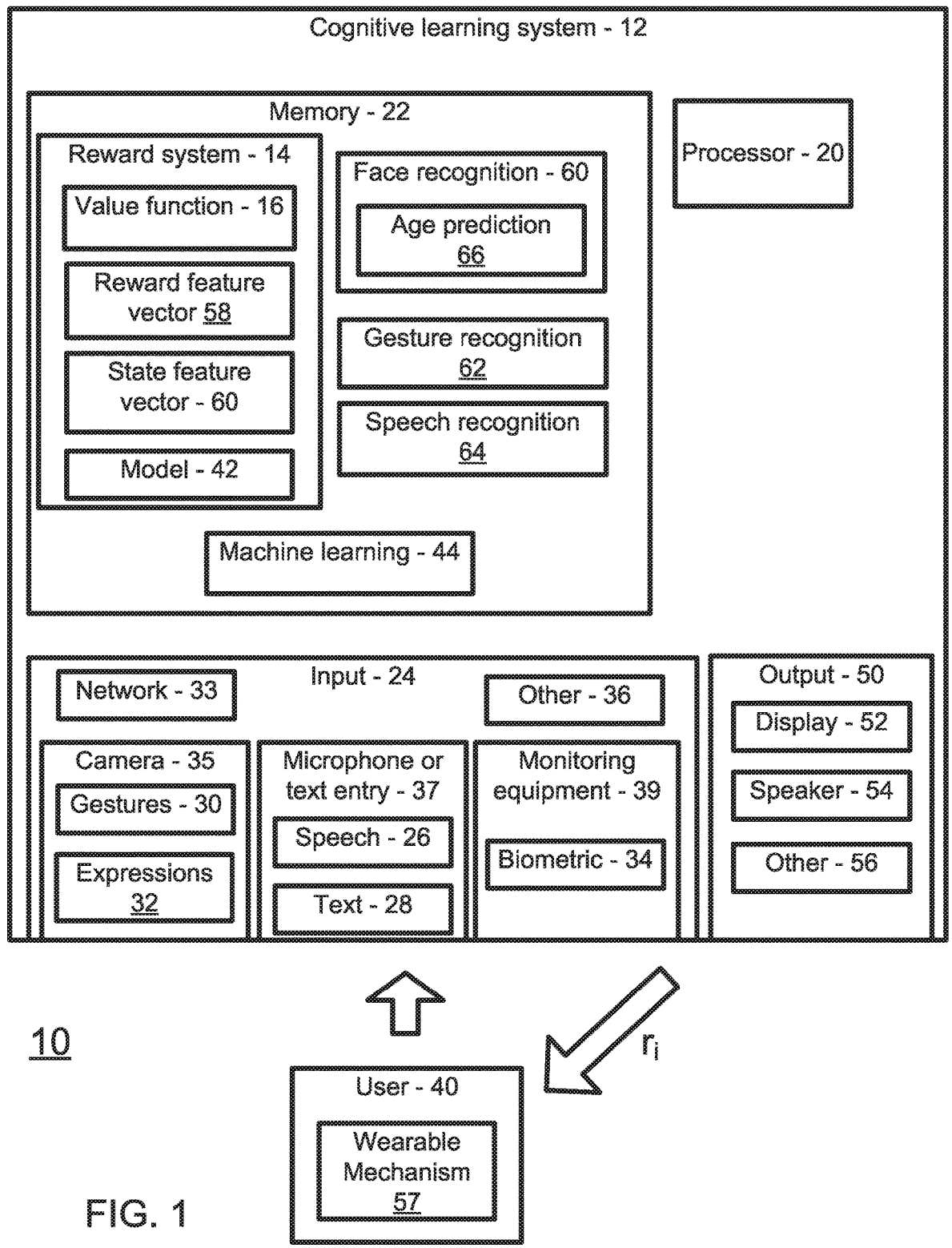
FIG. 1 is a block/flow diagram showing a cognitive computing system having a reward learning system integrated therein in accordance with an embodiment of the present invention.

Embodiments of the present invention provide systems and methods to produce real-time rewards-based education for users using machine learning. It should be understood that while reference will be made to a child or children, the present embodiments can be directed to people of any age or cognitive ability. Aspects of the present embodiments are particularly useful to children or individuals who may suffer from issues, such as, lack of attention or motivation.

In useful embodiments, focus is placed upon reinforcement learning (RL) for a rewards system. An RL system, in accordance with one embodiment, is an educational system that includes a role of learning or discovering what a child or adult finds rewarding. The reward of the RL system is the subjective experience of reward. The system's learning task is therefore distinct from a user's experience. By learning optimal actions, the system can deliver the reward to the child, and the system and the child learn together (even though their learning goals and the subject matter of their learning is different). In this way, successful completion of learning tasks by the child are met with increasingly rewarding stimuli produced by the system to reward work of the child. The delight and the learning motivation of the child are therefore maximized or well-controlled in accordance with learning goals or plans. Artificial intelligence and machine learning can be leveraged to provide reinforcement learning for the rewards system.

Systems, in accordance with aspects of the present invention, can be employed as an online learning system (e.g., network) or an individual computer system. During a lesson, the child can be rewarded for a correct answer or for learning progress. That reward can have a positive effect, or the child may not be interested in the reward. The system evaluates if the embellishment or reward is having the desired effect. The system can provide rewards for correct answers and learning progress and can interweave personal information about the child into the reward. Over time a model or feature vector is assembled to better understand a personalized reward system for a specific child.

It is to be understood that aspects of the present invention will be described in terms of a given illustrative architecture; however, other architectures, structures and process features and steps can be varied within the scope of aspects of the present invention.

It will also be understood that when an element is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including." when used herein, specify the presence of stated features, integers, steps, operations, elements and/or components, but do not preclude the presence or addition of one or more other features, integers, steps, operations, elements, components and/or groups thereof.

Spatially relative s such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein be interpreted accordingly.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, an educational system 10 is shown in accordance with one illustrative embodiment. The system 10 includes a cognitive computing system 12. The cognitive computing system 12 includes one or more processors 20 and memory 22. In one embodiment, the cognitive computing system 12 can include a computer system such as WATSON™ or other cognitive learning system.

In useful embodiments, a reward system 14 is provided and can be integrated within the cognitive computing system 12 where the reward is based on user's interaction with artificial intelligence. The reward system 14 can employ many types or combinations of types of learning models or systems. In one embodiment, the reward system 14 includes an actor-critic model.

In accordance with useful embodiments, the rewards system 14 is an agent (or controller) and optimizes its behavior by interacting with its environment. After taking an action in a current state, the agent (rewards system 14) receives a scalar reward from the environment, which gives the agent an indication of the quality of that action. Here, the reward is based on the interaction or state of a user 40 of the system 12. A function that indicates the action to take in a certain state is called a policy. The rewards system task is to find a policy that maximizes the total accumulated reward, also called a return. By following a given policy and processing the rewards, the rewards system 14 can build estimates or predictions of the return. This estimated return can be represented as a value function 16. Using this value function 16 permits the reward system 14 to make indirect use of past experiences to decide on future actions to take in or around a certain state.

The reward system 14 includes a multi-dimensional format using machine learning with a machine learning module 44 to estimate the value function 16 for reinforcement learning and reward generation. The reward is continually changing to get and keep the child engaged. The reward system 14 finds a best fit "recipe" that is right for the child to implement improved and faster learning. Best fit algorithms can include algorithms similar to Watson Chef™ or the like. In one embodiment, the "recipe" is dynamic and personalized to each user as they interact with the system 12 and grow in their ideal stimulations.

The user interacts with the system 12 through an input device or devices 24. Input devices 24 can include a camera or cameras 35 that can include a visible light camera, infrared (IR) camera or any other useful camera device. The input device or devices 24 can take on many forms, such as, e.g., a keyboard (37), a camera 35, a microphone (37), a mouse (37), electrodes, thermometers, etc. Input modes can include speech 26, text 28, gestures 30, facial expressions 32, biometric information 34, networks 33 and/or other 36 input information (electrodes for skin conductivity, thermometers for body temperature measurement, accelerometers for user movement sensing, heart and breathing monitors, etc.). Monitoring equipment 39 can include sensors for monitoring pulse rate, breathing, sweat, etc. The monitoring equipment 39 can work in conjunction with a wearable device or devices 57 (e.g., ring, writs band, adhesive mounted electrodes, etc.).

In one embodiment, a question and answer (Q&A) interaction can be performed between the system 12 and a user 40. In Q&A systems, there is active learning, a model 42 of the individual user 40 is what the system 12 tries to learn and then delivers better stimulation based on this model 42. Model 42 can include information about gestures, body movement (standing up/sitting down, fidgeting, shaking, etc.), as well as eye gaze direction, reading level, heart rate during activities, or any other useful state or environment information (which can include, testing level, speed of answering questions, page number, problem number, subject matter being tested, etc.). The state or environmental information is useful to learn the habits, abilities and tendencies of the user 40 so that rewards and rewards schemes can be learned.

In one embodiment, the cognitive reward system 14 embellishes a lesson in a way that maximizes the level of excitement of a child. The system 14 interweaves personal information about the child into the reward intelligently and improves its performance at rewarding the child over time. The system 12 can employ an artificial intelligence question and answer system (e.g., WATSON™) to learn about the child, then a machine learning module 44 selects and provides an adequate reward.

As the child (40) interacts with the system 12, the system 12 learns personal information about the child. The system 12 provides feedback and rewards to the child using an output device or devices 50. The output devices 50 can include a display 52, speaker 54 or other output 56. Other output 56 can include haptic feedback, olfactory feedback (e.g., pleasant smalls), audio feedback or sound (e.g., music, verbal praise, bell ring) or other rewards. Other rewards can include progress credits to open new levels of a game or test, messaging to a social network, etc.

In one embodiment, a reward can include a tweet, text message, email, etc. to a top ten list or other group likely to respond positively to the user's achievement. For example, after a success, a text message may be posted on a virtual page of the user in a social network application, especially one that is likely to promote additional positive feedback toward the user from others in the social network. In a simpler reward system, an email of a message of congratulations to the user 40 can be sent by the reward system 14.

In another example, if the child tells the system 12 that the child likes butterflies, the system 12 will show the child on the display 52, a butterfly, when a correct answer is given. If the child is not showing excitement from seeing the reward (butterfly), (e.g., based on a facial expression 32 using facial recognition by the system 12), the system 14 knows it is giving a wrong enhancement. If the child is showing excitement from the reward, the system 14 will show the butterfly again. Also, to further provide an enhancement, for example, using a butterfly, as an incentive, the reward system 14 can show an even better or more scintillating feature of the picture or videos can be incrementally shown at each step. A confidence level by the system 14 will be developed based on the child's experience as this will alter the present state.

An action taken by the reward system 14 depends on a state of the child, for example, the state can depend on information the child has shared, current facial expression, a history of the child's past interaction with the learning system 44, etc. The action is an attempt to reward the child using the learning system 44. Once a rewarding action is taken by the system 44, a measure of delight within the child is also measured and is associated with the reward (0 in the system 14. Next, actions can be adapted to maximize this reward by taking actions that increase the child's delight when an educational objective has been met using, e.g., the actor-critic model or other learning algorithm in the learning system 44.

In useful embodiments, the system 14 encourages learning in the child by delivering personalized and customized stimulation. The machine learning module 44 learns about and adapts to the user 40, making the user 40 excited by giving feedback causing their excitement level to grow for the purpose of stimulating better learning.

In one embodiment, quality of a state to be learned by the system 14 is highly dependent on feature extraction. A real-time modeling of a child's responses is employed to create the model 42. The model 42 can be based on historic information related to such things as facial expression analysis, an estimation of respiration rate, any other non-invasive measure. Feedback from wearable mechanisms 57 to provide biometric data 34 such as heart rate monitoring wrist bands, breath monitors, skin conductivity, etc., and feedback from cameras 35, such as facial expressions, gaze direction, 3D modeling of the user 40 (sitting, standing, etc.) and any other input can be employed. This information can be incorporated into the excitation analysis. However, data collection should be low profile and non-distracting. Separated methods of measure (e.g., remote measurements) are preferable (e.g., gesture recognition, speech recognition, etc. over a network). Continuous inputs to the system 12 provide monitoring of the response to the rewarding action, which may change with time, and the learning over these features will necessarily keep the system 14 fresh in its responses to child success.

A state feature vector 60 that can include possible states that a child is experiencing and can be stored and updated within the memory 22. Feature vectors 60 of a current state can include the information about the user from the model 42, from the user 40 (measurements, Q&A, etc.), or other sources, e.g., the internet, social networks, etc.) and environmental circumstances (e.g., problem number, page number of a test, progress level, etc.).

Feature vectors 58 of all possible rewards are also generated. A reward feature vector can include all possible rewards that can be presented and cause excitement in the child and can be stored and updated within the memory 22. In pattern recognition and machine learning 44, a feature vector is an n-dimensional vector of numerical features that represent some object. A sparse regression may be employed to determine how different reward dimensions contribute increasingly to child delight, e.g., combinations of rewards may have a greater impact on the delight of the child. For example, displaying pictures of multiple friends with music may have a greater impact then the picture of the music alone.

One feature extraction method can include independent component analysis (ICA) that can be performed by one or more of systems 12 and/or 14, which finds independent causes in state data for ensemble feature vectors from the state. These independent components may then be associated with the actions that are most successful for each cause. Additionally, specific rewards can be separated from cases that may be convoluted, e.g., a picture of a butterfly in the park causes excitement in the child but without ICA, it is unclear whether the child is excited about the butterfly or the park.

The feature vector or vectors 58 can be trained using the interactions with the user 40. In one embodiment, the ideal reward for each user can be isolated with fewer interactions. As interactions continue, the machine learning module 44 can update and modify the feature vectors 58, 60 to more specifically define the states of the child and associate these states with rewards that provide stimulation or motivation of the child. The reward system 14 has the model 42 updated that can associate the states with the rewards or predict improved rewards based on current states. The rewards are determined based upon a determination of what the child enjoys, responds to, and finds delight in.

In one application, the child's physiology, facial expressions, and interactions are measured. Physiology can be measured using a camera and gesture recognition software. Facial expressions can be measured using a camera and face recognition software. Interactions can be measured using Q&A, input biographical or preference data, gesture and facial recognition and speech recognition software (voice inflexions, pitch, oral noises, etc.). Using thresholds, comparisons and baseline testing, a determination of excitement level growth can be determined using video, audio and other cues. Upon progression in the learning process of the child, stimuli can be steered to achieve optimal excitement for a positive result. Excitement can be measured by the child's pulse, pitch of their voice, facial expression analysis or other methods.

In accordance with some embodiments, the reward system 14 is not restricted to user's preferences for understanding what the user likes or prefers by asking the user explicitly, but a learning based confidence level can be established for the reward options based on the cognitive system 12 and machine learning module 44. For example, the machine learning module 44 can apply user responses to previously applied reward schemes or events to rate or order the reward possibilities. The ranking of the reward possibilities can be employed in the escalation of rewarding the user.

The reward information can be extracted from various factors. These factors can illustratively include the following examples. In one example, age and expressions may be employed. By having an integrated camera scanner (input 24) coupled to the system 12, the age of a user 40 can be determined or approximated. In addition, expressions detection 32 of the user can be performed. An age prediction mechanism 66, which can be part of a facial recognition module 62 can be used to determine an estimate of the age of the user and inform the system 14.

In another example, an online profile of the user 40 may be employed by connecting to a network, such as the Internet or private network through a network interface 33. A web crawling search can be performed in a back-end using the camera scanner and also inquiring the name (if needed) to find the user 40 and extract useful information.

In yet another example, physical movement responses or gestures can be employed by having an integrated or external infrared (IR) camera 35 to track hand, limb, and body movement. Highly calibrated systems can also non-invasively track heart rate changes. This input can be processed to collect relevant data using gesture recognition software 62.

In another example, click stream data (e.g., mouse clicks) from the user's computer system can be included as input (24) including extended interaction duration, after and before reward administration, dwell time, and number of interactions.

All of the interaction data from multiple sources is arranged in the state feature vector 60 to provide a current state of the child or user. Based on this state, a rewards regimen can be computed. The rewards regime is dynamic in that it can include randomly selected rewards or employ a known script or list of rewards until more learning is obtained. The rewards will include a confidence or rating value in accordance with the state and/or the accomplishment of the user, which will be determined for each individual user 40.

The reward feature vector 58 includes a plurality of reward dimensions and combinations that can be used to increasingly provide positive stimulation of the user 40. The reward feature vector 58 is customized for the individual user 40 and is updated with every interaction using the machine learning module 44. As an example, a child learning program is launched by a user 40. As selections are made by the user 40, state and reward feature vectors 60, 58 can be updated using the machine learning module 44. As data is collected and changed over time, the model 42 is updated to reflect changes and create a user profile that can be employed in associating rewards with achievement levels within the reward system 14.

An example reward progression can include the following. From interactions, the model 42 can include the following data: The user 40 enjoys butterflies, playing in the park, has a best friend and has siblings. The cognitive system 12 can search for data related to these topics to populate the reward feature vector 58. The system 12 finds butterfly images and sorts them based on color and age appropriateness. The system 12 finds videos of butterflies, a picture of the best friend and a video of children playing in a park. The reward system 14 prioritizes these elements and associates these elements with the reward feature vector 58.

During a learning session on the application launched by the user 40. A sufficient number of correct answers are given for a first learning unit (e.g., a chapter in a textbook). The first reward may include a picture of a butterfly. The child's response is monitored using any combination of inputs (e.g., heart rate, facial expression, gestures or movement, speech or voiced sounds, etc.). The machine learning module 44 interprets the state levels associated with that reward and updates the feature vectors 58, 60 and the model 42 accordingly. The next reward for a second learning unit may include a video of butterflies in the park or may include a random selection of butterfly images, or can be a different reward computed to be on par with a second level accomplishment.

Other rewards, which can be from any number of sources and any number of topics customized for the user 40 can also be employed. In one example, the system 12 can show videos related to siblings playing to strike an emotional chord with the child to make the child happy—if the cognitive mechanism is able to detect if the child has siblings and the siblings have been determined to bring joy from the use cases mentioned. The rewards can be determined based on the profile or model 42 created, and the system 12 can detect the items favored by the child so as to present something more satisfying.

In accordance with the present embodiments, the reward system 14 is intangible and based on cognitive insight (e.g., the system 14 can evolve in accordance with its programmed goals). For example, if the system 14 shows one type of image and the child does not respond well, the system 14 knows to show another type of image. The feature vector 58 includes all possible rewards to learn the mapping from the user 40, user context or state, to reward. Therefore, the rewards are updated using cognitive feature extraction. The intangibility of the reward derives from an objective function or value function 16 employed to optimize, e.g., the delight of the user 40, as measured by cognitive monitoring and modeling facility of the system 12. Such objective function or value function 16 can include formulas with weights and variables to provide an increasing rewards protocol based upon state history and/or current state.

In accordance with aspects of the present invention, rewards granted can be unpredictable (e.g., not something which any person can guess, for example, by increasing price level or larger gifts, whether physical or digital), but also which is not random. Instead, the reward that is unpredictable and raises excitement for the user 40 at every level so that the user 40 remains engaged without getting bored (from the predictable history of prizes or rewards presented to the user 40).

The unpredictability is not merely random, but is guided by user preferences as learned in accordance with the machine learning module 44 and the input responses measured by the system 12. This unpredictability closely mirrors the reward valuation by the user 40, which at its core is also unpredictable. Due to an in-built webcam/camera scanner to automatically determine the growing age based on previous history and expressions and other neuromorphic signals for capturing feedback, the unpredictability of the rewards is achieved based on altered confidence levels being established with growing age and interests of the user (aggregating information of user's interests from social media websites with age and characteristics being determined in real time as one of the parameters).

The embodiments of the present invention learn to deliver specific rewards and content to the user 40 to maximize delight and thereby provide motivation in the current learning context. The reward is personalized based on content to maximize individual delight.

Figure 2:
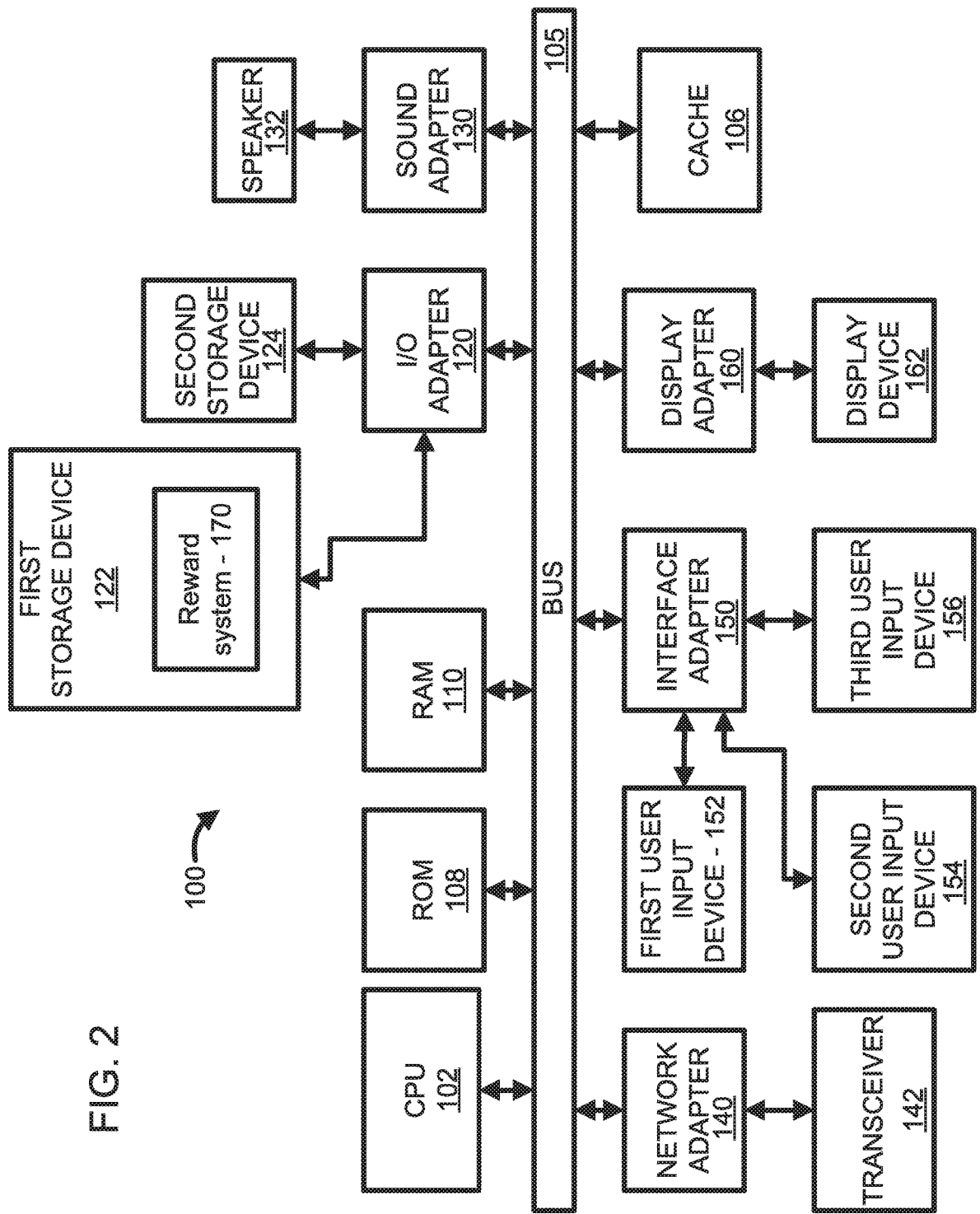
FIG. 2 is a block/flow diagram showing a processing system with a reward learning system in accordance with another embodiment of the present invention.

Referring to FIG. 2, an exemplary processing system 100 to which the present invention may be applied is shown in accordance with one embodiment. The processing system 100 includes at least one processor (CPU) 102 operatively coupled to other components via a system bus 105. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 105.

A first storage device 122 and a second storage device 124 are operatively coupled to system bus 105 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 105 by the sound adapter 130. A transceiver 142 is operatively coupled to system bus 105 by network adapter 140. A display device 162 is operatively coupled to system bus 105 by display adapter 160.

A first user input device 152, a second user input device 154, and a third user input device 156 are operatively coupled to system bus 105 by user interface adapter 150. The user input devices 152, 154, and 156 can be any of a keyboard, a mouse, a keypad, electrodes or sensors, an image capture device, a motion sensing device, a temperature sensing device (e.g., IR camera), a microphone, a camera, a camera scanner, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100 to be employed in accordance with a reward system 170.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

The processing system 100 includes the reward system 170, which includes the reward system 14 as described with reference to FIG. 1. The processing system 100 can work with external modules including but not limited to machine learning modules stored within the system 100 (or external to the system 100). The processing system 100 can include a user's computer system or may include an internet service provider's system. In any event, the reward system 170 provides for dynamic reward granting to the user in accordance with a reinforcement learning protocol or application in accordance with aspects of the present invention. The reward system 170 can be a stand-alone system configured to interact with a user with or without network connections. In one embodiment, the reward protocol can include a reward feature vector which stores all possible reward scenarios specific to the user and timing information for granting rewards. The reward protocol is dynamically updated in accordance with state changes as measured or determined.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
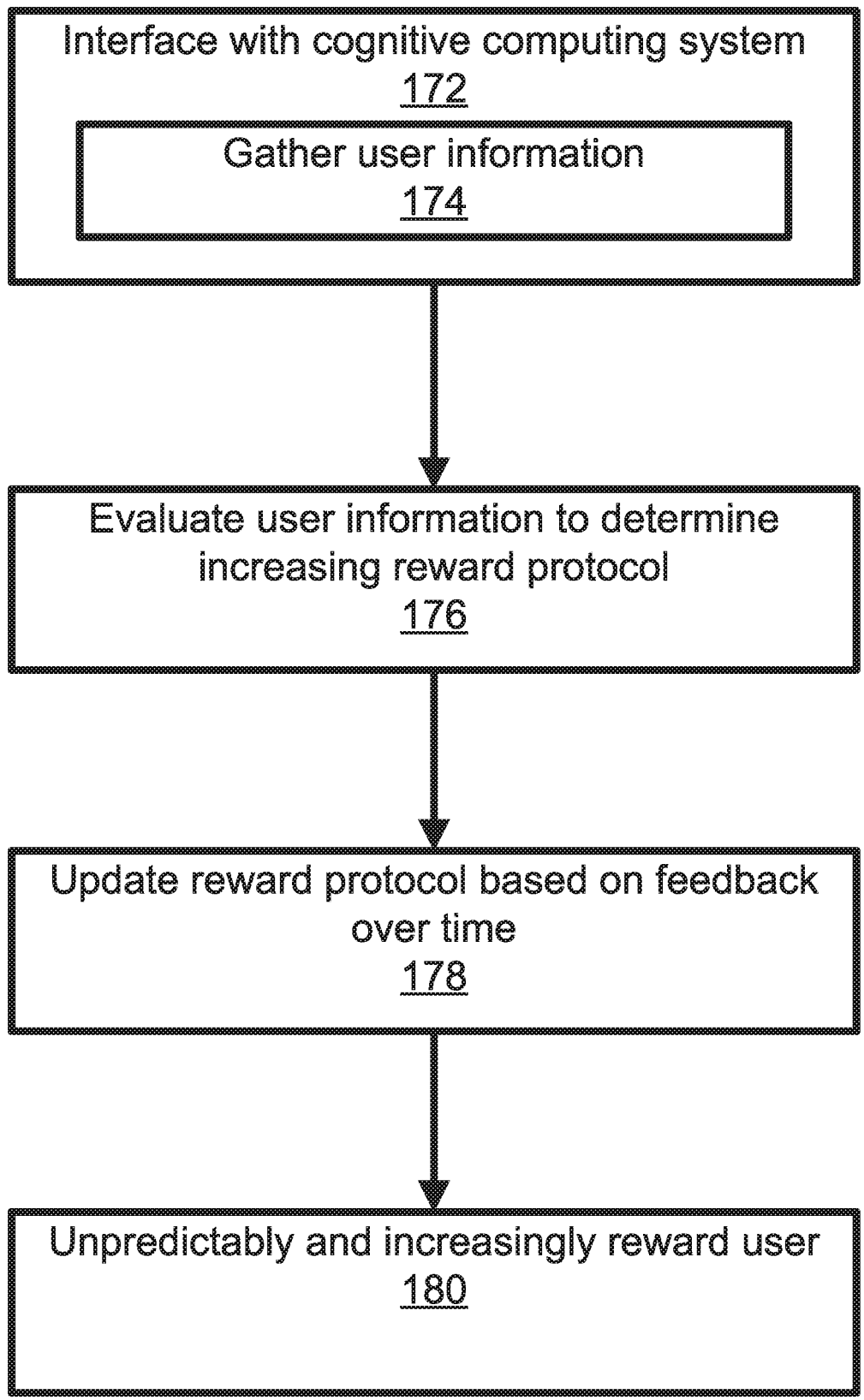
FIG. 3 is a block/flow diagram showing a system/method for reward based learning in accordance with another embodiment of the present invention.

Referring to FIG. 3, methods (systems) for reward-based learning are illustratively shown. In block 172, a user interfaces with a cognitive computing system which receives a plurality of modes of user information related to a state of the user. The user information can include searched information which includes information independently researched by the cognitive computing system. The user information can be directly or indirectly learned (e.g., measured) from the user.

Interfacing with the user can include gathering user information including, e.g., imaging the user with a camera to evaluate and measure in real-time the state of the user, in block 174. The plurality of modes of user information can include speech recognition, gesture recognition, user supplied data, network searched data and any other useful form of information. The state of the user can be stored in a state feature vector including multiple dimensions by associating with different features with states of the user, wherein the states of the user and changes to the states of the user are employed to evaluate rewards in the reward protocol. The state information can also be employed to generate or update a model of the user.

In block 176, the user information is evaluated with machine learning of the cognitive computing system to determine an increasing reward protocol to award learning achievements by the user. In block 178, the increasing reward protocol is updated using feedback (e.g., current state and/or historical data) from the user from the plurality of modes of user information related to the state of the user and the machine learning. The increasing reward protocol includes a reward system where the positive stimulation of the user is increased with each progressive achievement. The reward protocol can include a reward feature vector which stores all possible reward scenarios specific to the user, and the reward feature vector may include rewards associated with the state of the user as determined using machine learning.

In block 180, the user is unpredictably rewarded in accordance with the increasing reward protocol when goals are achieved. Unpredictably rewarding includes rewarding the user in accordance with content that positively stimulates the user but is not expected by the user. The positively stimulation of the user is determined in accordance with information learned about the user including the user's responses to stimuli. The user does not know and cannot easily predict the next reward. This achieved grater satisfaction when the reward is granted.

It is to be understood that this disclosure includes a detailed description on cloud computing; implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
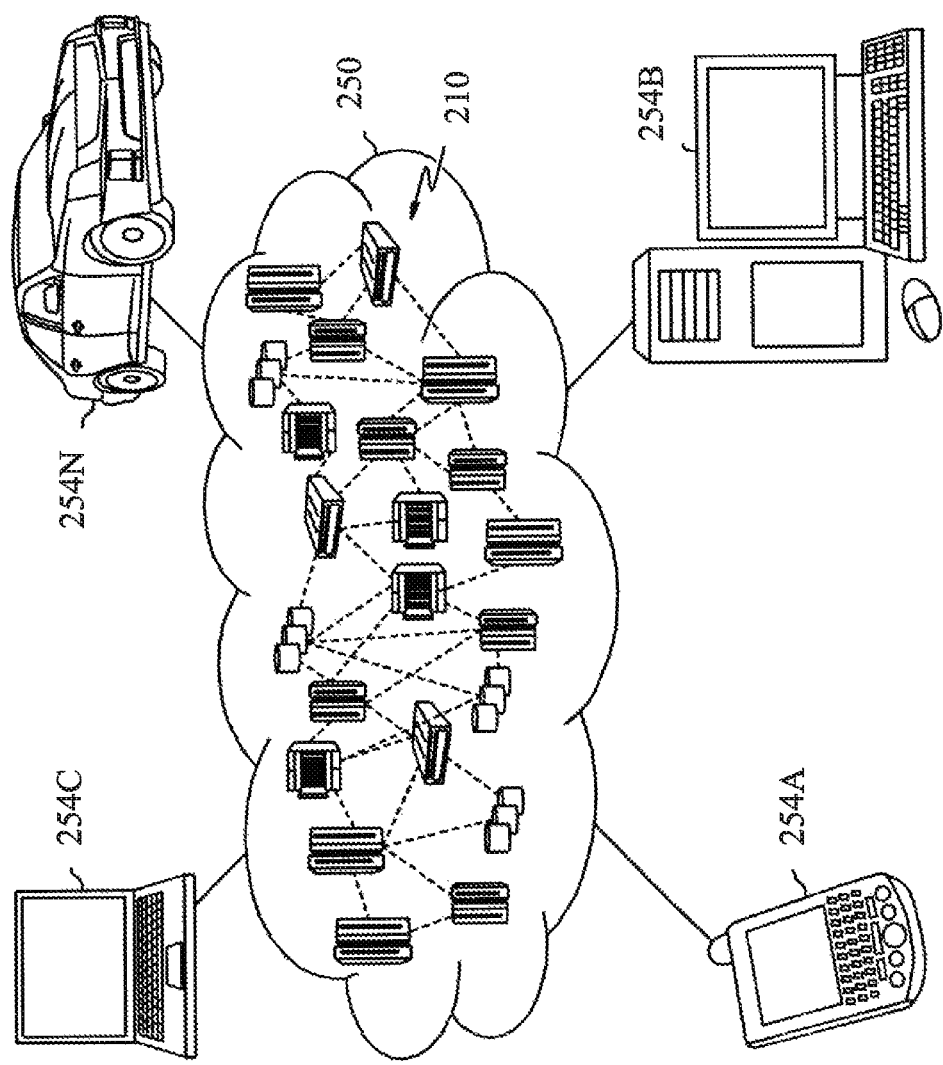
FIG. 4 is a block diagram showing an illustrative cloud computing environment having one or more cloud computing nodes with which local computing devices used by cloud consumers communicate in accordance with one embodiment.

Referring now to FIG. 4, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 4 are intended to be illustrative only and that computing nodes 210 and cloud computing environment 250 can communicate with any type of computerized device over any type of network and/or network addressable connection (e.g., using a web browser).

Figure 5:
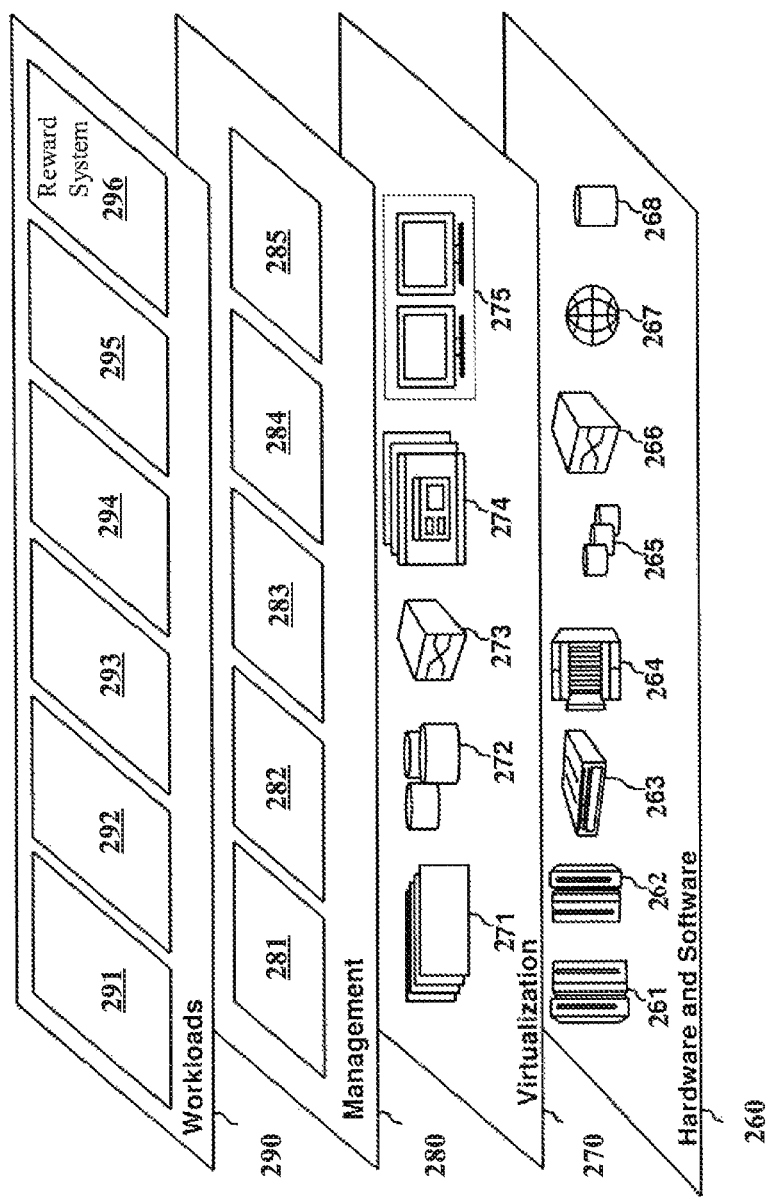
FIG. 5 is a block diagram showing a set of functional abstraction layers provided by a cloud computing environment in accordance with one embodiment.

Referring now to FIG. 5, a set of functional abstraction layers provided by cloud computing environment 250 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 260 includes hardware and software components. Examples of hardware components include: mainframes 261; RISC (Reduced Instruction Set Computer) architecture based servers 262; servers 263; blade servers 264; storage devices 265; and networks and networking components 266. In some embodiments, software components include network application server software 267 and database software 268.

Virtualization layer 270 provides an abstraction layer from which the following examples of virtual entities may be provided: virtual servers 271; virtual storage 272; virtual networks 273, including virtual private networks; virtual applications and operating systems 274; and virtual clients 275.

In one example, management layer 280 may provide the functions described below. Resource provisioning 281 provides dynamic procurement of computing resources and other resources that are utilized to perform tasks within the cloud computing environment. Metering and Pricing 282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 283 provides access to the cloud computing environment for consumers and system administrators. Service level management 284 provides cloud computing resource allocation and management such that required service levels are met. Service Level Agreement (SLA) planning and fulfillment 285 provide pre-arrangement for, and procurement of, cloud computing resources for which a future requirement is anticipated in accordance with an SLA.

Workloads layer 290 provides examples of functionality for which the cloud computing environment may be utilized. Examples of workloads and functions which may be provided from this layer include: mapping and navigation 291; software development and lifecycle management 292; virtual classroom education delivery 293; data analytics processing 294; transaction processing 295; and reward system 296.

Reward system 296 can be made available over the web and in the cloud environment to permit one or more users to remotely interact with the reinforcement learning system in accordance with embodiments of the present invention. Reward system 296 can be part of a testing or learning application provided to a plurality of users concurrently in a network environment. Reinforcement learning (RL) is provided in the context of an educational system that includes a role of learning or discovering what a child or adult finds rewarding. The system's learning task is therefore distinct from a user's experience as the system's goal is to learn what pleases each user on an individual basis. By learning optimal actions, the system 296 can deliver the reward to the child, and the system and the child learn together. In this way, successful completion of learning tasks by the child are met with increasingly rewarding stimuli produced by the system to reward work. The delight and the learning motivation of the child are therefore maximized or well-controlled in accordance with learning goals or plans.

Having described preferred embodiments for education reward systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for reward-based learning, comprising:
   interfacing with a user to receive a plurality of modes of user information related to a state of the user;
   evaluating the user information with machine learning of a cognitive computing system to determine an increasing reward protocol to award learning achievements by the user;
   updating the increasing reward protocol using feedback from the user from the plurality of modes of user information related to the state of the user and the machine learning; and
   unpredictably rewarding the user in accordance with the increasing reward protocol when goals are achieved.

2. The method as recited in claim 1, wherein interfacing with the user includes imaging the user with a camera to evaluate and measure in real-time the state of the user.

3. The method as recited in claim 1, wherein the state of user is stored in a state feature vector including multiple dimensions by associating with different features with states of the user, wherein the states of the user and changes to the states of the user are employed to evaluate rewards in the reward protocol.

4. The method as recited in claim 1, wherein the reward protocol includes a reward feature vector which stores all possible reward scenarios specific to the user, and the reward feature vector includes rewards associated with the state of the user as determined using machine learning.

5. The method as recited in claim 1, wherein unpredictably rewarding includes rewarding the user in accordance with content that positively stimulates the user but is not expected by the user.

6. The method as recited in claim 1, wherein the user information includes searched information which includes information independently researched by the cognitive computing system.

7. The method as recited in claim 1, wherein the plurality of modes of user information is selected from the group consisting of speech recognition, gesture recognition, user supplied data and network searched data.

8. The method as recited in claim 1, wherein evaluating the user information with machine learning includes employing an objective function to optimize user experience as measured by cognitive monitoring and modeling.

9. The method as recited in claim 8, wherein the objective function includes formulas with weights and variables to provide the increasing reward protocol based upon state history and/or current state of the user.

\* \* \* \* \*